United States Patent Office 2,789,941
Patented Apr. 23, 1957

2,789,941

PROCESS FOR PRODUCING BACITRACIN

Isadore R. Cohen, Forest Hills, N. Y., assignor to Commercial Solvents Corporation, Terre Haute, Ind., a corporation of Maryland No Drawing. Application May 4, 1953,
Serial No. 352,965

1 Claim. (Cl. 195—96)

My invention relates to a process for the preparation of bacitracin. More particularly, my invention relates to a process for producing high yields of bacitracin by the propagation of a bacitracin-producing strain of bacteria of the *Bacillus subtilis* group in a nutrient medium containing dextrin, calcium carbonate and a member selected from the group consisting of soybean meal, cottonseed meal, and mixtures of soybean meal and cottonseed meal, as more particularly described hereinafter.

The antibiotic bacitracin has been known since publication in the literature of an article by Johnson, Anker, and Meleney in "Science," vol. 102 (1945), pages 376–377, entitled "Bacitracin: A new antibiotic produced by a member of the *Bacillus subtilis* group." Since that time, several United States patents have issued describing production of bacitracin employing specific nutrient media. Among patents describing production of bacitracin are United States Patent No. 2,457,887, granted January 4, 1949, to John T. Goorley and United States Patent No. 2,567,698, granted September 11, 1951, to Grant D. Darker.

The previously disclosed processes for the production of bacitracin by fermentation have all been subject to certain disadvantages. For example, the yields of bacitracin were low, the highest yield described in the above references being 43 units per ml. described in the Darker patent. The Johnson et al. article described production of bacitracin utilizing a synthetic medium, which possesses the added disadvantage of being too expensive for commercial production.

I have now discovered a process for producing bacitracin utilizing an inexpensive, readily available nutrient medium capable of producing bacitracin in yields over twice as high as that previously obtained by the above-mentioned prior investigators. Furthermore, my new process makes possible the production of the above-described high yields of bacitracin in about one-fourth of the time previously employed for the production of the highest yields of bacitracin obtained by the above-mentioned prior investigators.

My new process consists essentially in inoculating a culture medium made up of dextrin and one of the group of substances consisting of cottonseed meal, soybean meal, or mixtures of cottonseed meal and soybean meal, calcium carbonate being added to the medium, with a bacitracin-producing strain of the organism *Bacillus subtilis* and then incubating the inoculated medium until maximum yields of bacitracin are produced. As is well known, of course, the above-mentioned ingredients are mixed in water to formulate the culture medium which is then inoculated and fermented by the usual methods well known to those skilled in the art. The essential feature in my invention is the use of the combination of dextrin, calcium carbonate, and one of the group cottonseed meal, soybean meal, or mixtures of cottonseed meal and soybean meal as the nutrient ingredients of the culture medium in which bacitracin is produced.

The soybean meal which I employ in my new culture medium for the production of bacitracin may be any of the usual commercial preparations including ground whole soybean, or meal prepared from soybeans from which the oil has been removed by crushing or by solvent extraction. The latter types are known as soybean oil meal (expeller) and soybean oil meal (solvent extracted) depending upon the manner in which the oil is removed. The cottonseed meal which I employ in my new culture medium is similar in type to the soybean meal insofar as presence or absence of cottonseed oil is concerned. In addition, partially purified or defatted cottonseed meal may be employed. Satisfactory results are obtained with a suspension of 4.0% by weight of the soybean meal, cottonseed meal, or mixture of soybean meal and cottonseed meal in water and I prefer to employ this amount for the practice of my invention. Larger amounts and smaller amounts may be used but, in general, amounts greater than 4% are unnecessary for the production of high yields while smaller amounts, resulting in lower nutrient content in the medium, produce yields below that which can be obtained when an amount corresponding to 4% by weight is employed.

The dextrin which I employ is an essential ingredient in the culture medium used for production of bacitracin and is a well-known material available commercially from a number of sources. Dextrin is a degradation product of starch and is obtained by hydrolysis of starch using acid or enzymes or dextrin can be obtained from starch by hydrolysis employing dry heat. Dextrin which I can employ in my process is a starch hydrolysis product which on test with iodine gives a color ranging from reddish violet to colorless and which contains at least about 30 glucose units in the molecule. I prefer to employ an amount of dextrin ranging from about 1 to about 2% by weight or more precisely 1.5% by weight. Amounts above this range can be employed tough little additional advantage is attained by employing an excess over about 2.0% by weight while smaller amounts can be employed with a resultant decrease in yield due to the decreased nutrient content in the culture medium.

I have found that the calcium carbonate which I employ in my new medium acts to control the pH throughout the fermentation process. Calcium carbonate may be added in excess at the beginning of the fermentation, and although the pH will rise, it will not rise to a pH at which bacitracin production is inhibited. The calcium carbonate acts as a buffer in maintaining the pH within the desired limits for maximum bacitracin yields and in addition it serves the purpose of supplying calcium ions, which have been found to be necessary for maximum bacitracin production. The optimum pH range for bacitracin production is from about 6.0 to 8.5 and I prefer to employ sufficient calcium carbonate to maintain the pH within this range throughout the course of the fermentation process.

The essential ingredients of my new culture medium for production of bacitracin are, of course, dextrin, calcium carbonate, and one of the group soybean meal, cottonseed meal, and mixtures of soybean meal and cottonseed meal. Other nutrient ingredients can be added to the culture medium such as, for example, mineral salts, as well as other carbohydrate and protein ingredients. In addition such other materials as antifoam agents, for example lard oil, may be employed.

My new fermentation medium is prepared according to any of the known methods. For example, all the solid ingredients, such as dextrin, calcium carbonate, and soybean meal, cottonseed meal, or mixture of soybean meal and cottonseed meal can be added to the proper amount of water, so as to have the desired proportion of solids in the medium. The resulting mixture is then sterilized by cooking for from about one-half to two hours at about 120° C. after which the mixture is cooled to about 37° C., inoculated with an active culture of bacitracin-producing bacteria of the *Bacillus subtilis* group and fermentation permitted to take place. The fermentation can be carried out in submerged culture tanks aerated by introducing air into the medium or by surface culture in shallow pans. Substantial quantities of bacitracin are generally produced in about 24 hours but occasional periods up to about 36 hours may be required.

At the conclusion of the fermentation, the bacitracin can be recovered by known processes. Suitable processes for the recovery of bacitracin from fermentation media are described in the disclosures of United States Patent 2,556,275, granted June 12, 1951, to Peter P. Regna and Isaiah A. Solomons III; United States Patent 2,582,921, granted January 15, 1952, to Jesse Charney; and United States Patent 2,609,324, granted September 2, 1952, to Murray Senkus and Peter C. Markunas.

The following examples are offered to illustrate my invention but I do not intend to be limited to particular proportions, procedures, or materials given therein. I intend for all equivalents of my invention which are known to those skilled in the art to be included within the scope of my invention as described in this specification and the attached claim.

The following examples describe the production of bacitracin and refer to the amount of bacitracin produced in terms of units. One unit of bacitracin is defined as the amount, which when diluted 1:1024 in a series of two-fold dilutions in 2 cc. of beef infusion broth, completely inhibits the growth of a stock strain (Chanin) of Group A Hemolytic Streptococcus when the inoculum used to seed the tubes is 0.1 cc. of a $10^{-2}$ dilution of an overnight culture of blood broth.

EXAMPLE

To a basic nutrient medium consisting of an aqueous suspension of 1.5% by weight dextrin (Globe Dextrine No. 182, Corn Products Refining Co.) and 0.5% by weight of calcium carbonate was added various additional materials from the group of cottonseed meal, soybean meal and mixtures of cottonseed meal and soybean meal. The various nutrient media thus formed were then inoculated with a bacitracin-producing culture of the organism *Bacillus subtilis* and the inoculated media was then incubated for a period ranging from 24 to 30 hours. At the end of the period of incubation, the nutrient media were assayed for bacitracin and the results are shown in the following table.

Table

| Additive | Assay, Units/ml. |
|---|---|
| 4% defatted Cottonseed Meal | 117 |
| 2% defatted Cottonseed Meal +2% Soybean Oil Meal | 124 |
| 1% defatted Cottonseed Meal +3% Soybean Oil Meal | 126 |
| 4% Soybean Oil Meal | 83 |
| 2% Cottonseed Meal +2% Soybean Oil Meal | 125 |
| 4% Cottonseed Meal | 95 |

Now having described my invention what I claim is:

A method of producing bacitracin comprising the steps of inoculating with a bacitracin-producing strain of *Bacillus subtilis* a culture medium comprising, as essential ingredients, dextrin, calcium carbonate, and a mixture of cottonseed meal and soybean meal, and then incubating the inoculated medium for a period ranging from about 24 to 30 hours.

References Cited in the file of this patent

UNITED STATES PATENTS

| | | |
|---|---|---|
| 2,457,887 | Goorley | Jan. 4, 1949 |
| 2,498,165 | Johnson | Feb. 21, 1950 |
| 2,567,698 | Darker | Sept. 11, 1951 |
| 2,627,494 | Keko | Feb. 3, 1953 |

OTHER REFERENCES

Johnson et al.: Mfgr. Chemist and Mfgr. Perfumer, XVIII, July 1947, p. 307.

Anker et al.: Journal Bacteriology, volume 55 (1948), pages 249 to 255. Page 250 particularly relied upon.

Inskeep: Industrial and Engineering Chemistry, vol. 43, No. 7, 1951, pp. 1488 to 1498.

Hendlin: Arch. Biochem., volume 24, pages 435 to 446. Page 443 particularly relied upon.